(No Model.) 2 Sheets—Sheet 1.
H. W. EVANS.
COMBINED CAR FENDER AND BRAKE.
No. 525,071. Patented Aug. 28, 1894.
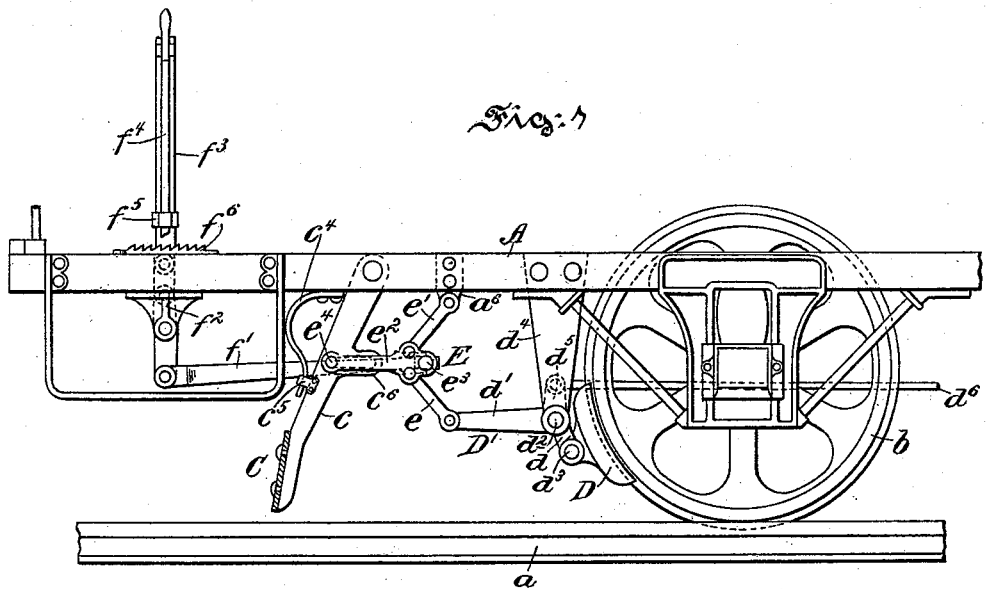
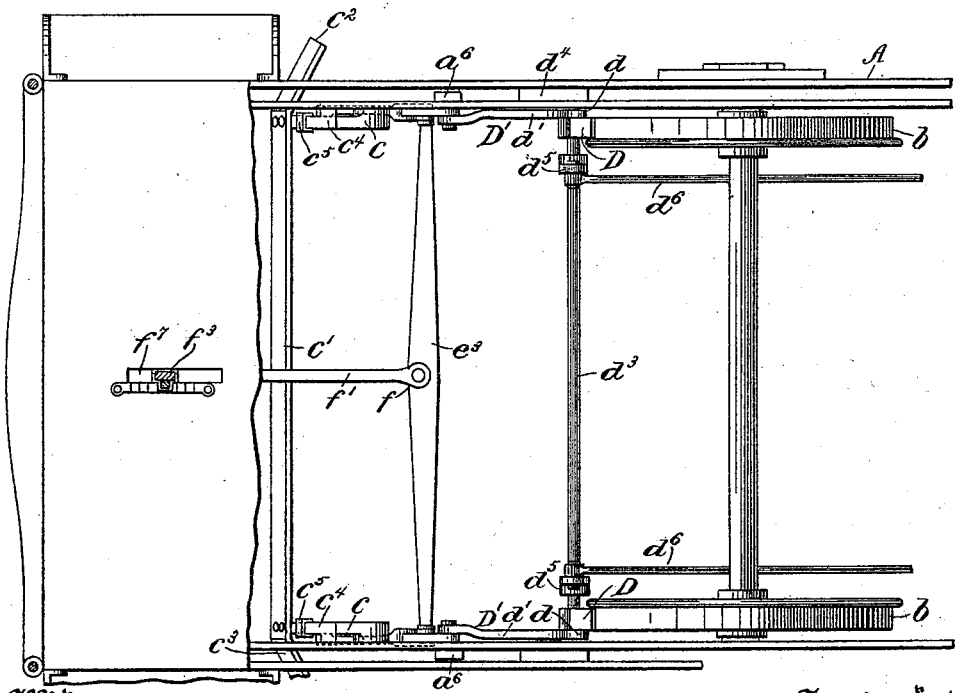
Witnesses:
Thomas M. Smith.
Richard C. Maxwell.
Inventor.
Hampton W. Evans,
By J. Walter Douglas,
Attorney.

(No Model.) 2 Sheets—Sheet 2.

H. W. EVANS.
COMBINED CAR FENDER AND BRAKE.

No. 525,071. Patented Aug. 28, 1894.

Witnesses:
Thomas M. Smith.
Richard C. Maxwell.

Inventor.
Hampton W. Evans,
By J. Walter Douglass
Attorney

UNITED STATES PATENT OFFICE.

HAMPTON W. EVANS, OF PHILADELPHIA, PENNSYLVANIA.

COMBINED CAR FENDER AND BRAKE.

SPECIFICATION forming part of Letters Patent No. 525,071, dated August 28, 1894.

Application filed March 29, 1894. Serial No. 505,528. (No model.)

*To all whom it may concern:*

Be it known that I, HAMPTON W. EVANS, a citizen of the United States, residing at the city of Philadelphia, in the county of Philadelphia and State of Pennsylvania, have invented certain new and useful Improvements in a Combined Fender and Car-Brake, of which the following is a specification.

My invention has relation to improvements in a combined fender and car brake; and it relates more particularly to the construction and arrangement thereof.

The principal objects of my invention are, first, to provide a car with a movable life guard or fender so arranged as that when an obstacle is presented thereto in the travel of the car the brake mechanism adapted to be actuated thereby will be applied to the wheels thereof to retard as well as permit of the stopping of the car in order to prevent loss of life and limb; and second, to provide a life guard or fender for a railway car and a brake mechanism adapted to be operated independently of the life guard or fender, yet at the same time the guard or fender is so arranged as that when an obstacle is presented in the path of the car, the brake mechanism will be operated to retard the speed of the car as well as to permit of the stopping of the same.

My invention consists of the improvements in a combined fender and car brake mechanism constructed, arranged and adapted for operation in substantially the manner hereinafter described and claimed.

The nature and general features of my invention will be more fully understood from the following description taken in connection with the accompanying drawings forming part hereof, and in which—

Figure 5:
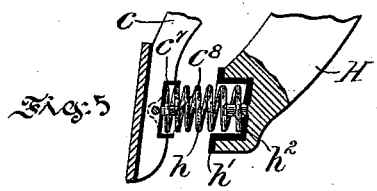
Figure 3:
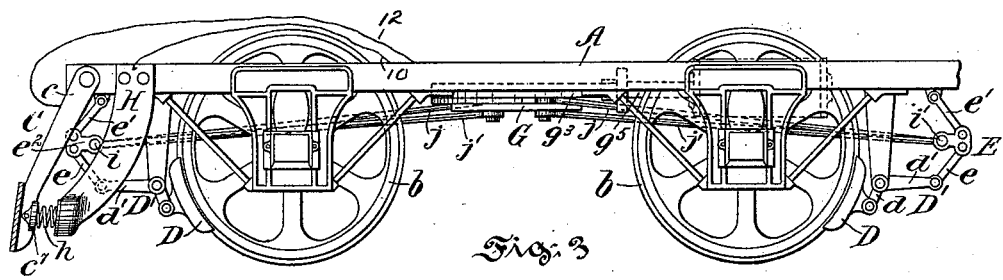
Figure 4:
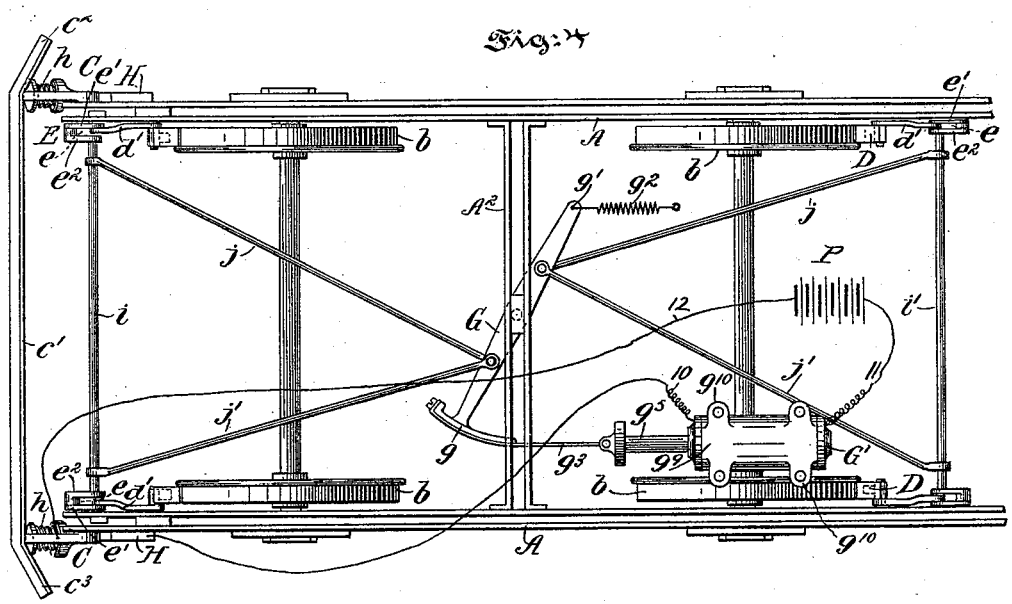
Figure 6:
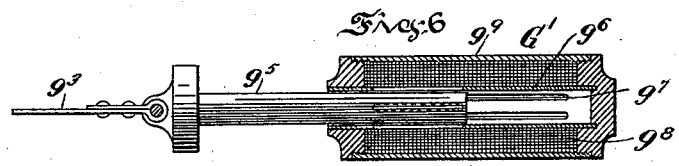

Figure 1, is a side elevational view partly in broken section of so much of the truck frame-work of a car as serves to illustrate the application of my invention thereto in conjunction with brake mechanism for retarding and stopping the car. Fig. 2, is a top or plan view thereof. Fig. 3, is a side elevational view of a modified form of a life guard or fender and brake operating mechanism automatically controlled by means of an electromagnetic appliance such as a solenoid or the like. Fig. 4, is a top or plan view thereof. Fig. 5, is a view partly in side elevation and partly in broken section of means adapted to establish a circuit between the fender or life guard and electro-magnetic device controlling the brake mechanism of the car; and Fig. 6, is a view partly in central section and partly in elevation of a known form of solenoid as illustrated in Fig. 4, for controlling the operation of the brake mechanism of the car.

Referring to the drawings with special reference to Figs. 1 and 2, A represents the truck frame of a car carrying wheels $b$, adapted to travel over rails $a$.

C, is the life guard or fender, comprising end slanting arms $c$, depending from the truck-frame A, and carrying at the lower portion thereof a cross frame or strip $c'$, bolted or otherwise secured thereto and which frame or strip is provided with flaring ends $c^2$ and $c^3$, as fully shown in Figs. 2 and 4. The pivotal depending arms $c$, of Figs. 1 and 2, of the life-guard or fender C, are supported to required position above the rails $a$, under the tension of retracting leaf or other springs $c^4$, respectively engaging the under side of the truck frame A, and loops $c^5$, secured to the depending arms $c$, for example, as illustrated in Fig. 1. The respective arms $c$, are provided with rear slotted lugs $c^6$, for purposes to be presently explained.

D, are the brake-shoes of the front and rear wheels $b$, which are respectively in pivotal connection with a link or arm $d$, of bell crank levers D', and the other link or arm $d'$, pivoted to a link $e$, of a toggle lever mechanism E. The bell crank lever D', on each side is fulcrumed at $d^2$, to a arm $d^4$, secured to and depending from the truck-frame A. $d^3$, is a cross-rod rigidly secured at each end to the bell crank lever D', as clearly shown in Fig. 2. The rod $d^3$ on each side has suitably clutched or splined thereto and operating in conjunction therewith, a pivotal link $d^5$, and pivoted thereto is a longitudinal rod $d^6$, connected with complemental rear mechanism similar to that just described for operating the rear brake shoes of the car on both sides thereof. The link $e'$, of the toggle mechanism E, is pivoted on each side to a projection or lug $a^6$, connected with the truck frame A, and both of the links $e$ and $e'$, are arranged in pivotal connection with a longitudinal arm $e^2$, in pivotal connection with the life guard or fender C. This arm $e^2$, on each side, is provided on the inner side thereof with a lug or projection $e^4$, adapted to engage the slotted projection $c^6$, of the fender C, in order to permit by means of said fender the respective brake-shoes to be operated to retard the speed of the car when an obstacle is presented in the path of said fender; and moreover, to prevent the actuation of the fender during the ordinary operation of the brakes of the car. The said arm $e^2$, on each side has pivoted thereto a cross-bar $e^3$, and centrally thereto at $f$, is pivoted a longitudinal lever arm $f'$. This lever arm $f'$, is pivotally connected at the forward end with a vertical lever $f^2$, in pivotal connection with a brake operating lever $f^3$, having suitably connected therewith a pawl lever $f^4$. This pawl lever $f^4$, is adapted to engage a rack $f^6$, located adjacent to a slot $f^7$, provided in one of the platforms of the car and through which slot extends vertically the pawl actuated brake lever $f^3$.

The life guard or fender C, as illustrated in Figs. 1 and 2, is so arranged as to operate ordinarily in conjunction with the brake operating rod $f^3$, yet nevertheless when an obstacle is presented in the path of the fender or guard the resistance offered by the spring $c^4$, will be overcome to cause the toggle mechanism E, to be actuated thereby to permit the brake shoes D, of the respective wheels of the car being brought into contact therewith to stop the car or to afford the attendant-in-charge of the brakes an opportunity to so manipulate the same by means of said operating lever $f^3$, or other similar appliance for such purpose connected with the brake-shoes of the car as to quickly stop the same and thus to prevent loss of both life and limb.

In Figs. 3 and 4, the fender and car brake mechanism differs from that of Figs. 1 and 2, in the following particulars: The fender C, in this instance, is provided on each side in the lower rear portion thereof with an insulated socket $c^7$, having a metallic contact $c^8$, and a coiled spring $h$, engages said socket and a similar insulated socket $h'$, with a contact $h^2$, provided in the lower portion of a curved arm H, depending from the truck-frame A, of the car and rigidly secured thereto. $i$ and $i'$, are front and rear cross-rods pivotally supported to the lever arms $e^2$, of the toggle mechanism E. Extending diagonally or otherwise from the cross-rods $i$ and $i'$, from each end of the truck frame A, are rods $j$ and $j'$, which are respectively connected with a centrally arranged reciprocating lever G, pivoted to the cross-strip $A^2$, of the truck-frame A, and having at one end a grooved arc-shaped device $g$, and at the other end an eye $g'$, engaged by one end of a coiled resistance spring $g^2$, suitably connected at the other end to the bottom frame of the car or to the truck frame A. The arc-shaped grooved end $g$, of the lever G, has attached thereto in any preferred manner a chain or cord $g^3$, which is suitably connected with a plunger $g^5$, of a solenoid G', of any general type such as fully illustrated in Fig. 6, and with wires 10 and 11, the latter being connected from one end of the solenoid G' and with one pole of a battery or other source of energy P, and the wire 10, from the other end thereof with the metallic curved arm H, and by a line 12, in connection with the fender C, a circuit is adapted to be established with the other pole of the battery or source of energy P. It may be here remarked that the circuit through the solenoid G', may be included in a shunt of the motor circuit of the car in such manner as that when the current through the motor is cut out from the car the brakes will be automatically or otherwise applied to the respective wheels of the car for stopping the same. The solenoid G', may be provided with a brass tube $g^6$, adapted to receive the plunger $g^5$, and formed with slots $g^7$, and with a heavy coil of insulated copper wire $g^8$. This may be mounted in a shell or casing $g^9$, with projecting lugs $g^{10}$, in order to secure the same to position in connection with the frame of the car, as will be readily understood by reference to Fig. 4. In use, when an obstacle is presented in the path of the fender or life guard C, the same will be actuated to cause the toggle mechanism E, on the respective sides of the car in pivotal connection with the bell crank levers D', adapted to control the brake shoes D, through the intervention of the rods $i$ and $i'$, and diagonally disposed cross levers $j$, $j'$ and G, and of the plunger $g$, of the solenoid G', to be actuated in order to establish a circuit from the fender through the depending metallic arms H, on the respective sides of the car by means of the spring controlled contacts $c^7$ and $h^2$, with the motor of the car in order to stop the car by the application automatically of the shoes D, to the peripheral surfaces of the wheels of the car or to permit of the application by the attendant-in-charge of the brakes by the manipulation of the hand operating lever $f^3$, in a certain direction to bring the car to a stop. This will only be necessary should from any cause the brake mechanism hereinbefore described fail to work automatically to stop the car. The hand operating lever $f^3$, of the brake mechanism of the car, it may be here remarked, will be applied by the attendant-in-charge of the car ordinarily in the running thereof without the fender or life guard and its accessories interfering therewith in the manner as illustrated in Fig. 1.

I do not wish to be understood as limiting myself to the use of a solenoid for electrically operating the brake shoes of a car, but may employ any other electrical appliance that may be found well suited as a motor for such purpose, provided the arrangement is such as to be able to establish a circuit from the fender therewith so as to apply the brake-shoes to the wheels of the car to stop the car when an object is brought in contact with the fender and at the same time with the motor circuit of the car cut out.

Having thus described the nature and objects of my invention, what I claim as new, and desire to secure by Letters Patent, is—

1. The combination, with a car having wheels and brake-shoes adapted to engage therewith and a brake operating lever, of a fender provided with a frame having bent ends or wings, said frame secured to movable arms connected with the truck-frame of the car, springs in movable engagement with the arms of said fender for supporting the same at an angle from said truck-frame and above the track-rails, toggle-and-bell-crank mechanisms on each side of the car in connection with said fender and brake-shoes, connecting rods from said brake operating lever with said toggle mechanism, the construction and arrangement being such that the brake-shoes are either applied by means of said brake operating lever or automatically by means of said fender under the impact of an object brought against the same, substantially as and for the purposes set forth.

2. The combination, with a car having brake-shoes adapted to engage with the wheels thereof and a brake operating lever, of a fender provided with a frame having bent ends or wings and said frame secured to movable arms connected with the truck frame of the car, and having sockets, springs engaging said fender sockets with pins and complemental sockets with pins of hangers projecting from said frame and rigidly secured thereto for supporting said fender in a slanting position, and so as to permit of a movement of said fender, toggle and bell crank mechanisms located on each side of the car and in connection with said fender and brake-shoes, and means, as described, for permitting of the application of said shoes to the wheels of the car by the impact of an object against said fender, substantially as and for the purposes set forth.

In testimony whereof I have hereunto set my signature in the presence of two subscribing witnesses.

HAMPTON W. EVANS.

Witnesses:
J. WALTER DOUGLASS,
THOMAS M. SMITH.